(12) United States Patent
Ignatuk et al.

(10) Patent No.: US 7,818,408 B1
(45) Date of Patent: Oct. 19, 2010

(54) AUTOMATED VIRTUAL INTERFACE FAILOVER IN A MASS STORAGE CLUSTER

(75) Inventors: James Andrew Ignatuk, Cranberry Township, PA (US); David Phillip Kutz, Greensburg, PA (US)

(73) Assignee: Network Appliance, Inc., Sunnyvale, CA (US)

( * ) Notice: Subject to any disclaimer, the term of this patent is extended or adjusted under 35 U.S.C. 154(b) by 57 days.

(21) Appl. No.: 12/109,138

(22) Filed: Apr. 24, 2008

(51) Int. Cl.
*G06F 15/177* (2006.01)

(52) U.S. Cl. .................. 709/221; 709/220; 370/252; 370/254; 714/4; 714/13

(58) Field of Classification Search .......... 709/220, 709/221; 370/254, 252; 714/4, 13
See application file for complete search history.

(56) References Cited

U.S. PATENT DOCUMENTS

| 6,292,905 | B1 * | 9/2001 | Wallach et al. ............. 714/4 |
| 7,076,691 | B1 * | 7/2006 | Dobberpuhl et al. ........ 714/13 |
| 7,152,179 | B1 * | 12/2006 | Critchfield ................. 714/4 |
| 7,337,214 | B2 * | 2/2008 | Douglass et al. ........... 709/214 |
| 2003/0018927 | A1 * | 1/2003 | Gadir et al. ................. 714/4 |
| 2003/0105805 | A1 * | 6/2003 | Jorgenson ................... 709/203 |
| 2004/0267897 | A1 * | 12/2004 | Hill et al. .................. 709/217 |
| 2009/0049161 | A1 * | 2/2009 | Takeuchi et al. ............ 709/222 |
| 2010/0077067 | A1 * | 3/2010 | Strole ....................... 709/223 |

OTHER PUBLICATIONS

U.S. Appl. No. 11/736,197, filed Apr. 17, 2007, for "System and Method for Virtual Interface Failover within a Cluster."
U.S. Appl. No. 11/741,862, filed Apr. 30, 2007, for "System and Method for Verification and Enforcement of Virtual Interface Failover within a Cluster."
U.S. Appl. No. 11/676,894, filed Feb. 20, 2007, for "Resynchronization between Persistent Management Store and Dynamic Configuration."

* cited by examiner

*Primary Examiner*—Thu Ha T Nguyen
(74) *Attorney, Agent, or Firm*—John R. Ley; Leon S. Erikson

(57) ABSTRACT

Virtual interfaces on a cluster of servers in a mass data storage system are automatically reconfigured by transferring an internet protocol (IP) address hosting responsibility from one operative port to another operative port within the cluster, in response to a change in operative status of any port within the cluster.

22 Claims, 11 Drawing Sheets

| | PORT 22a-1 | IPAa-1a, IPAa-1b |
|---|---|---|
| SERVER 24a | PORT 22a-2 | IPAa-2a, IPAa-2b |
| | PORT 22a-3 | IPAa-3a, IPAa-3b |

| | PORT 22b-1 | IPAb-1a, IPAb-1b |
|---|---|---|
| SERVER 24b | PORT 22b-2 | IPAb-2a, IPAb-2b |
| | PORT 22b-3 | IPAb-3a, IPAb-3b |

30a { SERVER 24a, SERVER 24b }

| | PORT 22c-1 | IPAc-1a, IPAc-1b |
|---|---|---|
| SERVER 24c | PORT 22c-2 | IPAc-2a, IPAc-2b |
| | PORT 22c-3 | IPAc-3a, IPAc-3b |

| | PORT 22d-1 | IPAd-1a, IPAd-1b |
|---|---|---|
| SERVER 24d | PORT 22d-2 | IPAd-2a, IPAd-2b |
| | PORT 22d-3 | IPAd-3a, IPAd-3b |

30b { SERVER 24c, SERVER 24d }

| | PORT 22e-1 | IPAe-1a, IPAe-1b |
|---|---|---|
| SERVER 24e | PORT 22e-2 | IPAe-2a, IPAe-2b |
| | PORT 22e-3 | IPAe-3a, IPAe-3b |

| | PORT 22f-1 | IPAf-1a, IPAf-1b |
|---|---|---|
| SERVER 24f | PORT 22f-2 | IPAf-2a, IPAf-2b |
| | PORT 22f-3 | IPAf-3a, IPAf-3b |

30c { SERVER 24e, SERVER 24f }

| RING GROUP 1 | | RING GROUP 2 | |
|---|---|---|---|
| SERVER | STATUS | SERVER | STATUS |
| SERVER 24a | 1 | SERVER 24b | 1 |
| SERVER 24c | 1 | SERVER 24d | 1 |
| SERVER 24e | 1 | SERVER 24f | 1 |

FIG.8  96

| PORT | SERVER | PORT STATUS | IP ADDRESS OF PORT |
|---|---|---|---|
| 22a-1 | 24a | 0 | IPA-1, IPA-2, IPA-3 |
| 22a-2 | 24a | 1 | IPA-4, IPA-5, IPA-6 |
| 22a-3 | 24a | 1 | IPA-7, IPA-8, IPA-9 |
| 22b-1 | 24b | 1 | IPA-10, IPA-11, IPA-12 |
| 22b-2 | 24b | 1 | IPA-13, IPA-14, IPA-15 |
| 22b-3 | 24b | 1 | IPA-16, IPA-17, IPA-18 |
| 22c-1 | 24c | 1 | IPA-19, IPA-20 |
| 22c-2 | 24c | 1 | IPA-21 |
| 22d-1 | 24c | 1 | IPA-22, IPA-23, IPA-24 |
| ⋮ | ⋮ | ⋮ | ⋮ |
| 22f-3 | 24f | 1 | IPA-25, IPA-26 |

AUTOMATED VIRTUAL INTERFACE FAILOVER IN A MASS STORAGE CLUSTER

CROSS-REFERENCE TO RELATED INFORMATION

This invention is related to the subject matter described in U.S. patent application Ser. No. 11/736,197, filed Apr. 17, 2007, for "System and Method for Virtual Interface Failover within a Cluster"; Ser. No. 11/741,862, filed Apr. 30, 2007, for "System and Method for Verification and Enforcement of Virtual Interface Failover within a Cluster"; and Ser. No. 11/676,894, filed Feb. 20, 2007, for "Resynchronization between Persistent Management Store and Dynamic Configuration"; all of which are assigned to the assignee hereof and all of which are incorporated herein by this reference.

FIELD OF THE INVENTION

This invention relates to mass data storage systems of the type organized into clusters, and more particularly to a new and improved apparatus and method for automatically establishing rules for failing over virtual interfaces (VIFs) among operative network interfaces (ports) of server computers (servers) in the cluster, thereby permitting automatic and dynamic changes in hosting Internet protocol (IP) addresses among the ports of servers of the cluster, without requiring manual programming by a system administrator to achieve configuration failover capability.

BACKGROUND OF THE INVENTION

Modern businesses rely almost exclusively on electronic data storage for preserving and utilizing their necessary business operating information. Electronic data storage is useful only if the data can be reliably preserved and quickly accessed. If the data can not be preserved against inadvertent loss, the available information may not be accurate and can not be used to operate the business in a trustworthy manner. Quickly accessing accurate data is also essential because the pace of modern business requires immediate answers and responses in order to be effective. Thus, both reliable preservation of the data and immediate access to the data are essential.

Modern mass data storage systems and methods recognize the essential nature of reliable preservation and immediate access to the data. The typical approach to ensuring both characteristics is to employ functional features generally referred to as redundancy. In the context of mass data storage, redundancy involves the capability of accessing or creating a duplicative copy of the data, should some unforeseen event occur which makes a primary copy of the data unreliable or inaccessible, and doing so relatively quickly.

Redundancy is incorporated in essentially every level and aspect of modern mass data storage systems. For example, an entirely separate mass data storage system which maintains a secondary duplicate copy of the data may be established at a remote site, with frequent updates to the duplicate copy to reflect changes in the primary copy of the data at the primary site. Under these circumstances, if a catastrophic event should occur at the primary site, the remote site supplies the services that would normally be supplied by the primary site. As another example, the data storage computers (servers or filers) which provide access to the data storage units, typically hard disk drives (disks) or solid-state memories, and which perform data read and data write operations, are organized in such a way that if one server fails, another server may rapidly assume responsibility for performing the read and write operations to the data storage units connected to the failed server. This arrangement of paired-together servers is sometimes referred to as a server failover pair. As a further example, the server failover pairs may be organized together in clusters containing multiple servers and server failover pairs. The servers in the cluster are interconnected through networks both internal to the cluster and external to the cluster which allow the servers in the cluster to communicate with other servers in the cluster, and thereby obtain rapid access to data which would otherwise be unavailable in the event of a failure.

Redundancy is also important in communicating with a mass data storage system. A user operates a user computer, typically referred to as a client, and the client communicates requests for data services to a server of the mass data storage system. The server responds to the client requests by performing data read and write operations and then responds to the client. In this manner the server serves the client by responding to the client requests.

In order to perform data service transactions in a client-server relationship, there must be a reliable communication path between the client and server. The client and the server are almost always located remotely from one another, so the communication path may be relatively short, for example within an office building, but it is typically a much greater distance, for example across a city, state or country, or even between different continents. The typical client-server communication path is through a computer communication network, such as a local area network if the client and server are located relatively close to one another, or over a public or private access computer communication network, such as the Internet if the client and server are located at substantially greater geographic distances.

Data communications between computers through the computer communication network rely on the use of internet protocol (IP) addresses. Each computer has an IP address associated with it. Use of the IP addresses assure that the communications are addressed to and received by the two computers which are the participants in the communication. Each computer includes a network interface adapter, commonly referred as a port, through which the messages or packets are communicated over the computer communication network. This network interface adapter transmits the IP address of the computer sending the communication, accepts only those communications addressed to the IP address of the receiving computer, and ignores all communications that are not addressed to the receiving computer. The network interface adapter is a hardware component to which a cable or other physical medium is attached. The signals from the computer communication network are received and transmitted on the cable.

One redundancy concern in mass data storage systems is a possibility that the cable through which the signals are transmitted and received by the network interface adapter will become severed, disconnected, or otherwise nonconductive or unavailable due to some unforeseen event. Under such circumstances, network communications between the client and the server become impossible since there is no signal path to or from the network interface adapter. To address this concern in mass data storage systems, techniques have been developed to move the IP address from the network interface adapter connected to the failed communication path to another network interface adapter which is connected to a fully functional communication path. Moving the IP address from one interface adapter to another allows continued client-server communication due to the redundancy capabilities among the servers in the cluster, even when the original communication path has become inoperative.

The ability to move the IP address between different network adapters is typically referred to as transferring a virtual interface (VIF). The virtual aspect arises because the IP address is not exclusively associated with a single network interface adapter. In the context of moving IP addresses to be hosted by different and functional network interface adapters, it is also typical to refer to the connections to the network interface adapters as ports. Thus, a VIF involves both the combination of an IP address and a port which hosts that IP address. In the case of a VIF, the IP address does not change, but the port posting that IP address may change, thereby changing the VIF.

The aspects of moving the VIF from one port or server to another port or server in a mass storage data system are described in the above-identified US patent applications. The technique described in these patent applications involves manually writing a set of failover configuration rules. Under circumstances where a port is recognized as inoperative, the VIF associated with the inoperative port is transferred to another operative port of the server in the cluster. The failover configuration rules define the manner of attempting a transfer to other ports. If none of the ports of the failover configuration rules are available, the VIF cannot be transferred.

The failover configuration rules previously required manually programming to invoke those rules with respect to each port of each server of the mass data storage system. In modern mass data storage systems, there are multiple servers in a cluster, e.g. 24 servers, and each of the servers may have multiple ports, e.g. 16, associated with it. Thus in this example, up to 384 ports (24×16) may be available to host IP addresses. However, to assure that the failover will occur, the failover configuration rules must be specifically programmed to specify each of these 384 ports to which the port may failover. The failover configuration rules are specific programmed instructions which define each other failover port and the sequence to be followed in attempting to failover to each other failover port.

To assure redundancy, it is not unusual for each port to have as many as 13 separate ports to which it may fail over to, and under the circumstances of this example, almost 5000 (24×16×13) separate failover rule instructions must be programmed for the mass data storage system. An individual person known as the system administrator must manually program these failover instructions. This amount of programming becomes labor-intensive and tedious, and consequently becomes prone to mistakes. However, without this manual programming, VIF failover redundancy is not possible or fully effective.

Another difficulty associated with individually programming all of the failover configuration rules is that changes in the size of the mass data storage system, such as by adding additional servers or server failover pairs in the cluster, requires additional programming of failover configuration rules to accommodate failovers to and from the added servers. The pre-existing failover configuration rules must be modified to interact with the newly-added servers, thereby requiring some degree of change to all of the pre-existing failover configuration rules. Otherwise, delays, restrictions or bottlenecks in reading and writing data would occur.

SUMMARY OF THE INVENTION

The present invention involves automatically establishing failover configurations for virtual interfaces (VIFs) in a multiple-server mass storage system. The invention automatically establishes failover configurations in a manner which achieves redundancy and approximately equal distribution of the VIFs, thereby enhancing system performance. The invention automatically accommodates adding or subtracting servers from the cluster or mass storage system, while obtaining the benefits of immediate and reliable accessibility to the data and while preserving communication capabilities. The automatic aspects of the invention are achieved without manual programming. The failover configuration rules are not subjected to potential mistakes or inefficiencies that might be unknowingly introduced by manual programming.

In accordance with these characteristics, one aspect of the present invention relates to a method of reconfiguring virtual interfaces on a cluster formed by a servers in a mass data storage system. Each server includes a port which interfaces to a computer network for communicating data service requests. Each virtual interface is formed by an operative port which hosts an internet protocol (IP) address that is used to communicate the data service requests on the computer network. The method involves establishing a group of servers within the cluster by recognizing each operative server which has at least one operative port, recognizing a change in operative status of any port or any server of the group, and when desirable transferring the IP address from one port of one server in the group to another operative port of one server of the group in response to the change of operative status.

This aspect of the invention may be implemented by communicating status messages among all of the servers of the cluster which indicate the operative status of each server and each port of each server, establishing the group of operative servers and a list of operative ports of each server in response to the status messages, recognizing a change in operative status of any port of any server of the group, and then transferring the IP address from one port of one server of the group to another operative port of one server of the group in response to recognizing the change in operative status.

Another aspect of the invention relates to a mass data storage system for communicating data service requests with client computers over a computer network. The data storage system includes a plurality of servers organized in a cluster. Each server includes at least one port for interfacing with the computer network by which to communicate the data service requests between the server and the client computers. At least one port of each server hosts an internet protocol (IP) address used in communicating the data service requests. Each server also includes at least one data storage unit by which to perform the data service requests communicated on each operative port attached to the server. Each server includes at least one processor and a memory unit, and the memory unit includes operating instructions for performing the data service requests. The memory unit further includes a configuration rules table containing information defining the operative status of servers and the operative status of each port of each server. The servers of the cluster communicate status messages among themselves to maintain the operative server status information and operative port status information current in the configuration rules table. The operating instructions in the memory unit cause the servers to reconfigure virtual interfaces on the servers by transferring hosting of IP addresses from one operative port of the servers to another operative port of the servers. Executing the operating instructions causes reconfiguration of the virtual interfaces by establishing a group of operative servers from the server status information in the configuration rules table in response to the status messages, establishing a list of operative ports of each server of the group from the port status information in the configuration rules table in response to status messages, recognizing a change in operative status of any port of any server of the group from the server status and port status information in the configuration rules table, and transferring the IP address from one port of one server in the group to another operative port of one server in the group in response to a recognized change in status information.

Other aspects of the invention, and a more complete appreciation of the present invention, as well as the manner in which the present invention achieves the above and other improvements, can be understood by reference to the following detailed description of presently preferred embodiments taken in connection with the accompanying drawings, which are briefly summarized below, and by reference to the appended claims.

BRIEF DESCRIPTION OF THE DRAWINGS

FIG. 2 is a block diagram of servers of a cluster of the mass data storage system shown in FIG. 1, illustrating exemplary ports and IP addresses associated with the ports.

FIG. 8 is an illustration of a subpart of a configuration table contained in a local storage medium of the server shown in FIG. 7, illustrating information defining a ring group of servers in the cluster of the mass data storage system shown in FIG. 1.

FIG. 9 is an illustration of a subpart of a configuration table contained in a local storage medium of the server shown in FIG. 7, illustrating information defining port relationships with servers, status of the ports and IP addresses posted by the ports of the servers of the cluster of the mass data storage system shown in FIG. 1.

DETAILED DESCRIPTION

Figure 1:
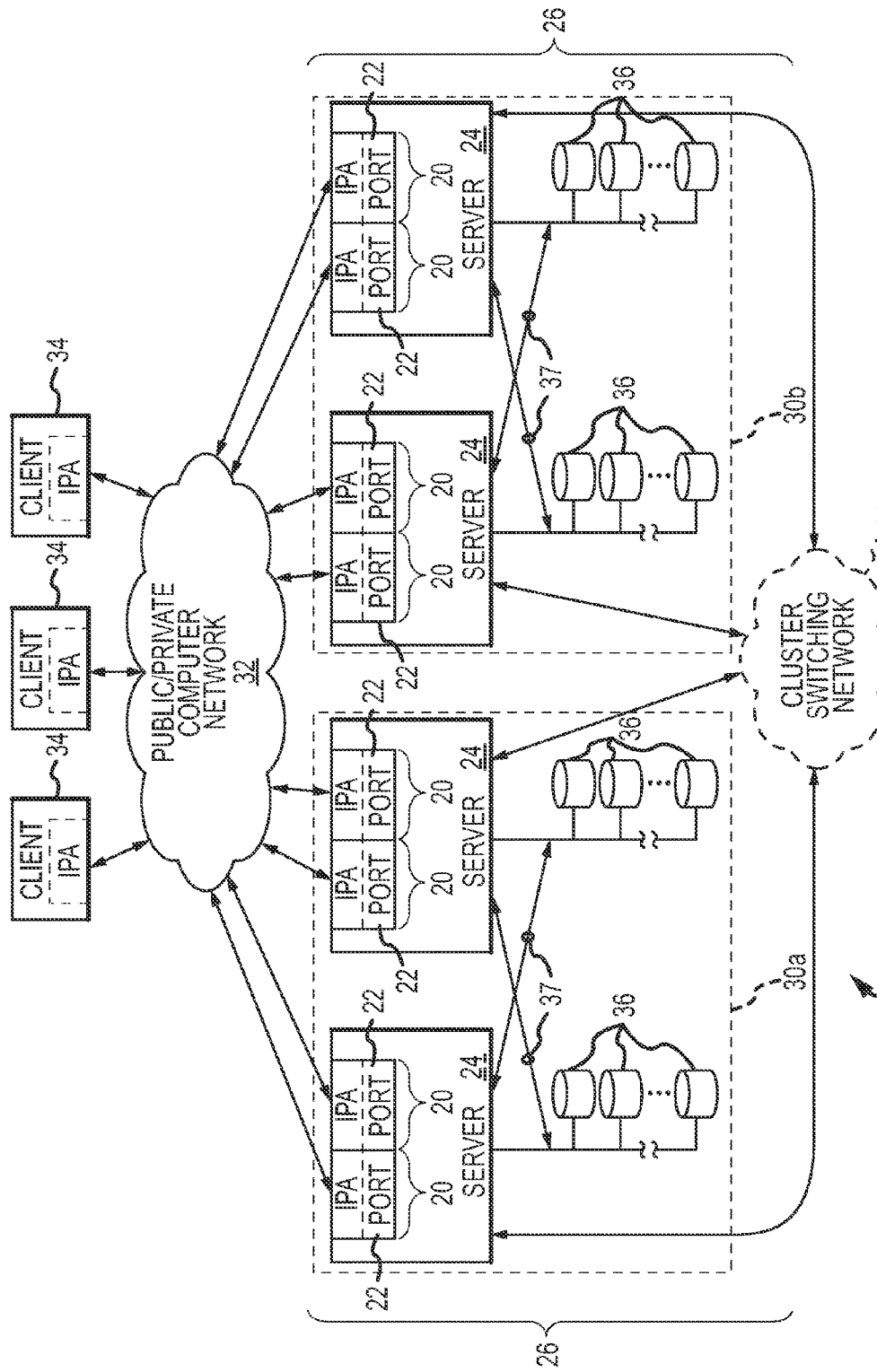
FIG. 1 is a generalized block diagram of a mass data storage system which incorporates the present invention, shown connected by a public or private access computer communication network to client computers.

The present invention involves automatically assigning and reassigning virtual interfaces (VIFs) 20 to and among public or private access computer communication network interfaces or ports 22 of server computers (servers) 24 of a cluster 26 of servers 22 which form a mass data storage system 28, as exemplified in FIG. 1. Each VIF 20 is formed by a port 22 and an internet protocol (IP) address, designated as an IPA, as well as other well-known associated information, such as a mask, routing information, etc. (none of the other information is specifically shown). Each port 22 is all or any part of a conventional network interface adapter, such as a typical Ethernet interface adapter. Each server 24 includes at least one port 22, but typically includes multiple ports 22. A cluster 26 includes multiple servers 24. Typically, the servers 24 in the cluster 26 are organized in pairs, known as server failover pairs, two of which, 30a and 30b, are illustrated in FIG. 1. When the cluster 26 is formed by server failover pairs, one server failover pair 30a or 30b is the minimum number of servers 24 required to form a cluster 26.

Users of the mass data storage system 28 communicate over a conventional public or private access computer communication network 32 (for example the internet or a virtual private network) with the servers 24 of the cluster 26, through user computers referred to as clients 34. Each client 34 includes a network interface adapter (not shown) which communicates the IP address of the client 34 and the IP address of the server 24, as well as the other conventional information, and delivers the communication message, known as a packet, to the computer communication network 32. The computer communication network 32 uses the IP address of the server and the other routing information to deliver the message to the cluster 26 of servers 24 of the mass storage system 28. Each port 22 of the cluster 26 examines the IP address of any arriving message and discards any message which does not contain the IP address(es) hosted by that port 22.

The one port 22 which hosts the IP address of the arriving message accepts that message. The accepting port 22 and the IP address hosted by that accepting port form the VIF 20 to the server 24 for the message sent by the client 34. The server 24 having the accepting port 22 then acts on the service request contained in the arrived message and delivers the requested service in the form of a reply message transferred over the computer communication network 32 back to the client 32 that originally initiated the request. To transfer the reply message back to the initiating client 32, the server 24 includes the IP address of the client 34, which was included in the original message, as well as other conventional information, to a packet containing the reply message, and sends the packet from the port. The computer communication network 32 routes that reply message back to the initiating client using the IP address of the initiating client.

The present invention involves determining and responding to the functionality of each of the ports 22 and all of the servers 24 in the cluster 26, to assure the maximum or substantially enhanced redundancy in communicating messages to the servers of the cluster in response to requests from the clients 34. Upon recognizing that any one of the ports 22 or servers 24 is no longer functionally transmitting and receiving messages, the IP address(es) hosted by that inoperative port is/(are) automatically transferred to one (or more) operative port(s) 22 in the cluster 26. Similarly, upon recognizing that any one of the ports or servers which was previously inoperative has become operative, the IP address(es) hosted by other operative ports is/(are) automatically transferred back to those ports to which they were originally assigned in an initially-established and approximately equal VIF distribution, thereby obtaining a more equalized distribution of the VIFs among the operative ports. In this manner, each VIF 20 is automatically reconfigured to a functional port 22 which is capable of assuming responsibility for, and continuing, communications with the clients 34, and doing so by moving toward the initially-assigned, approximately-equal distribution of the VIFs among the functioning ports of the cluster.

Transferring the VIFs 20 involves assigning each IP address from the inoperative port to another functional port 22 of the same or a different server within the cluster 26, thereby causing the functional port to host the IP address. By transferring the IP address hosting responsibility to a functional port 22, the VIF 20 is transferred or moved to a functional port which assures the continued availability of the VIF for use by the clients 34. Moving the VIF 20 in this manner ensures that clients 34 are able to communicate with the cluster 26 of servers 24 to obtain mass data storage services without significant disruption, despite the inoperativeness of a port 22, thereby achieving redundancy against potential failed communications with the clients 34.

Transferring responsibility for hosting the IP addresses to functional ports 22 on the servers 24 of a cluster 26, is known, and is described in the above-referenced patent applications. The present invention does so automatically, thereby improving the ability for transferring the VIFs and achieving an enhanced level of redundancy.

The utility of moving the VIFs in the manner described is made possible because of the redundancy characteristics of the cluster 26. The redundancy characteristics of the servers 24 in the cluster 26 allows moving the VIFs to other ports on other servers while still preserving the ability to interact with the data that was previously stored and controlled by the server having the inoperative port. The redundancy characteristics of the servers 24 of the cluster 26 are briefly described below.

Each server 24 of the cluster 26 is connected primarily to a collection of data storage units, which are exemplified by hard disk drives (disks) 36 shown in FIG. 1. The disks 36 are commonly used data storage units, but solid-state semiconductor memories and other forms of electronic data storage media could also constitute the data storage units. The data storage units exemplified by the disks 36 store and retain the data in response to write commands, and supply copies of the stored data in response to read commands. Each server 24 primarily controls the read and write commands to the disks 36 which are associated with that server 24, thereby delivering the requested data services. Preferably, the disks 36 are organized into a conventional random array of independent (or inexpensive) disks (RAID) configuration, because a RAID configuration offers substantial benefits in redundancy with respect to the data stored on the disks 36.

Redundancy between the servers 24 within each server failover pair 30a and 30b is achieved by a capability of each server 24 of the server failover pair to access the disks 36 connected to the other server 24 of that server failover pair. This capability is represented by links 37. Each link 37 illustrates that each server 24 of each storage failover pair 30a and 30b has the ability to communicate with the disks 36 which are normally controlled by the other server 24 of that storage failover pair. Therefore, if one of the servers 24 of a storage failover pair should become inoperative, the other server of that storage failover pair can assume the responsibility for serving requests for the inoperative server, by having access to the disks 36 which are normally controlled by the inoperative server of the server failover pair.

Further redundancy between the servers 24 within the cluster 26 is achieved by interconnecting all of the servers 24 of the cluster 26 through a conventional cluster switching fabric or network 38. The cluster switching network 38 permits any of the servers 24 of the cluster 26 to communicate with any of the other servers of that cluster. The cluster switching network 38 delivers the communications from any server 24 of the cluster 26 to another server of the cluster. If one of the servers is nonfunctional, the disks 36 connected to the nonfunctional server can be accessed by directing communications through the cluster switching network 38 to the other server of the server failover pair, to allow the other server to obtain access to the disks 36 which are normally controlled by the inoperative server.

Another level of redundancy for communication between the servers 24 of the cluster 26 is through the computer communication network 32, although in most cases use of the cluster switching network 38 will result in more immediacy with less latency compared to communication through the computer communication network 32. Communications between different servers 24 of the cluster 26 through the computer communication network 32 occur in essentially the same manner as the communications described above between the client 34 and one of the servers 24. Even though use of the cluster switching network 38 is preferred in terms of immediacy, use of the computer communication network 32 is still available as another level of redundancy.

The redundancy characteristics obtained by organizing the servers in server failover pairs, and through the cluster switching network 38 and the computer communication network 32, make it possible to transfer the VIFs to other ports 22 of any server 24 in the cluster 26 and still ensure that the disks 36 associated with any server 24 may be accessed for any requested data service operations.

Figure 3:
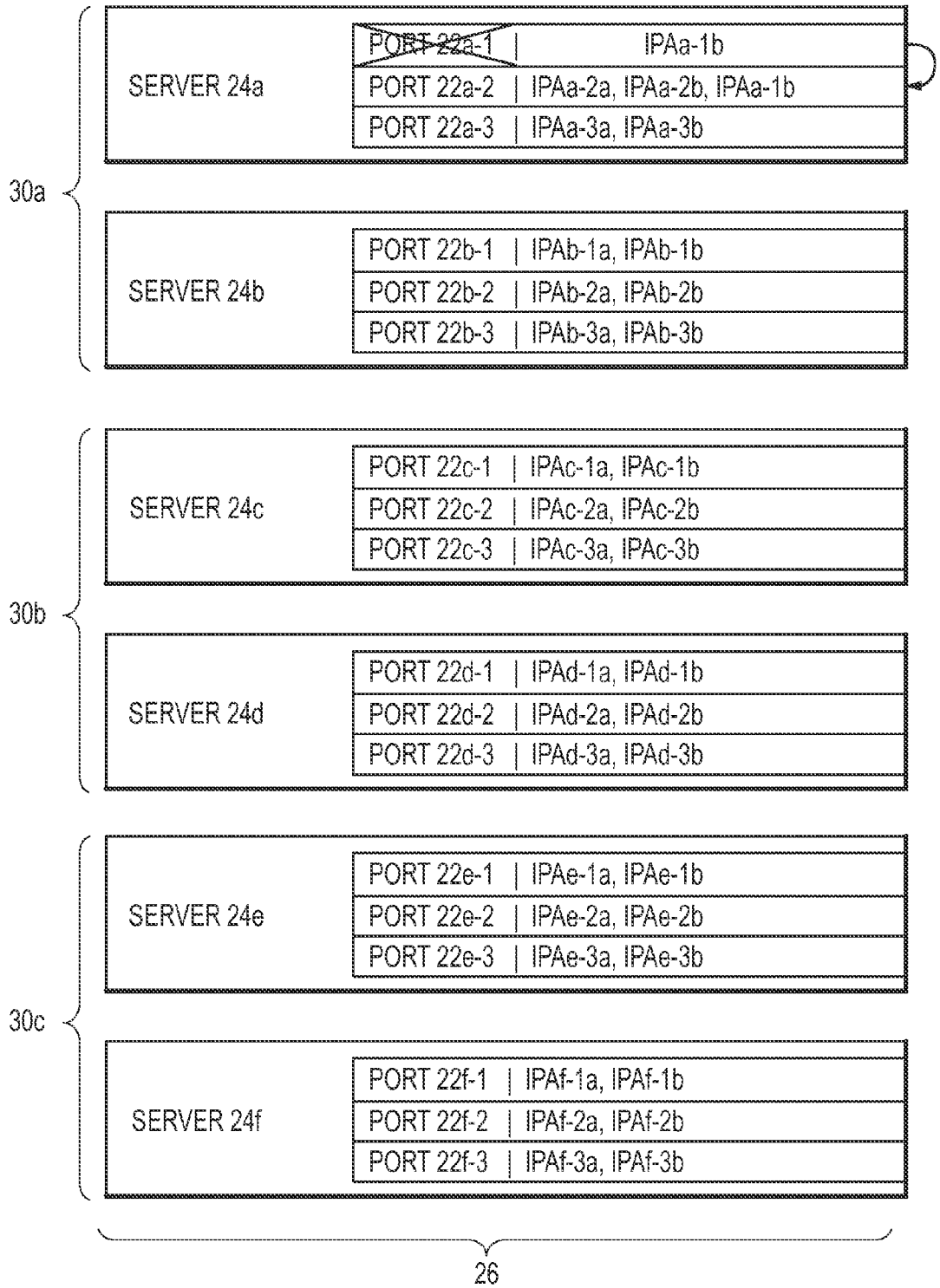
FIGS. 3-5 are block diagrams similar to FIG. 2 which illustrate characteristics of the failover configurations rules applicable to the ports of the servers of the mass data storage system shown in FIG. 1.
Figure 4:
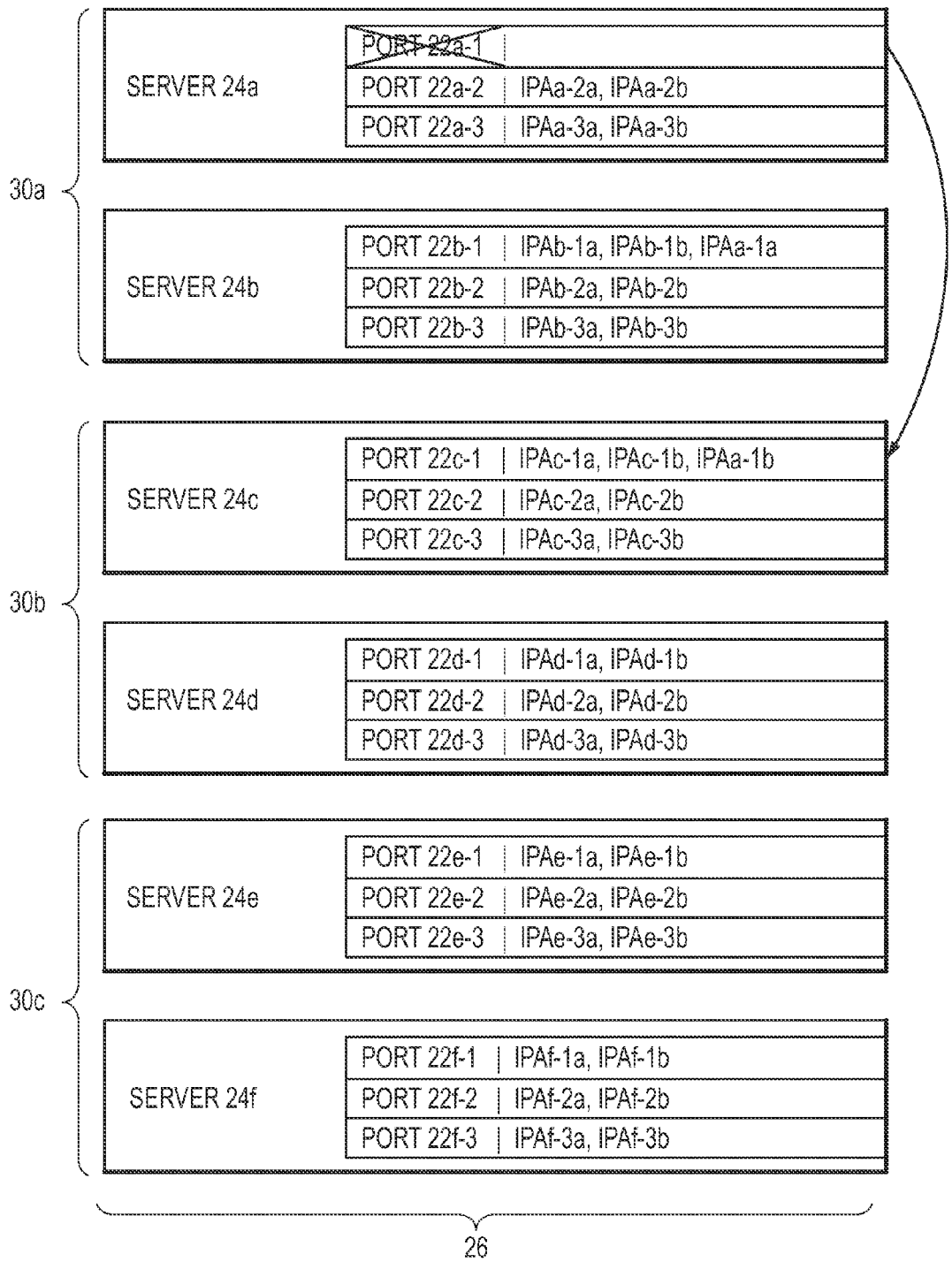
Figure 5:
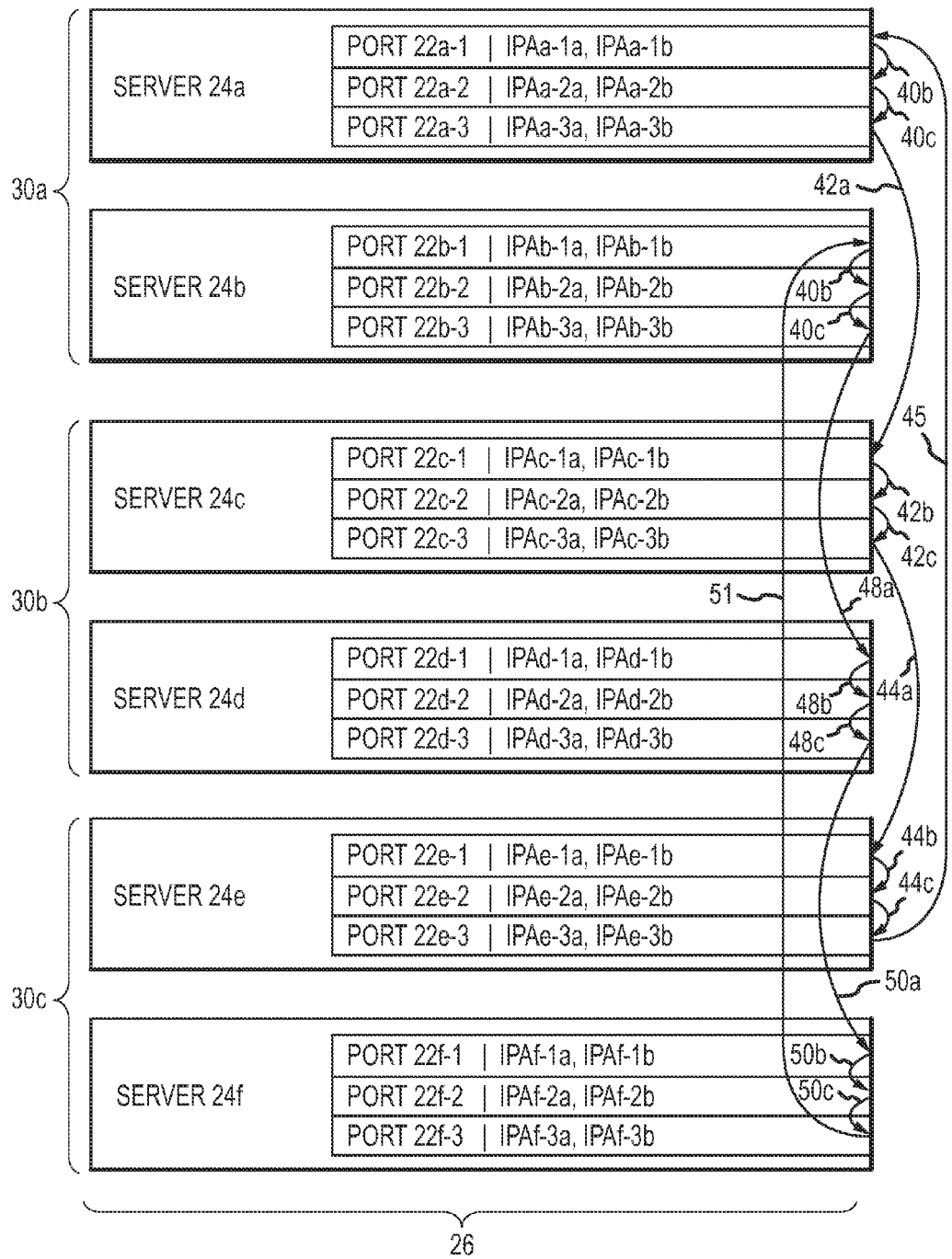

The automatic nature of configuring the VIFs among the ports 22 of the servers 24 of the cluster or 26 is illustrated in FIGS. 3-5. FIG. 2 forms the basis for the events shown in FIGS. 3-5. In the example shown in FIG. 2, three server failover pairs 30a, 30b and 30c are illustrated as forming the cluster 26. Servers 24a and 24b are shown as forming the server failover pair 30a; servers 24c and 24d are shown as forming the server failover pair 30b; and servers 24e and 24f are shown as forming the server failover pair 30c. The cluster 26 shown in FIG. 2 as having three server failover pairs 30a, 30b and 30c is exemplary. At least one server failover pair is required to form a cluster 26, but many more server failover pairs could be incorporated in the cluster 26.

For the exemplary purposes shown in FIG. 2, each server 24a-24f has three ports associated with it. The three ports associated with server 24a are designated as 22a-1, 22a-2 and 22a-3. Similarly, the three ports associated with server 24b are designated as 22b-1, 22b-2 and 22b-3. A similar reference identification arrangement designates each of the three ports of each of the remaining servers 24c-24f.

Again for the exemplary purposes shown in FIG. 2, each of the ports is illustrated as hosting two VIFs 20. The two VIFs 20 hosted by the port 22a-1 respond to IP addresses IPAa-1a and IPAa-1b. The two VIFs 20 hosted by the port 22a-2 respond to IP addresses IPAa-2a and IPAa-2b, while the two VIFs 20 hosted by the port 22a-3 respond to IP addresses IPAa-3a and IPAa-3b. A similar referencing description applies to the two IP addresses to which the remaining ports respond, resulting in each IP address (IPA) assuming a first subordinate designator of the port which originally hosts that IP address to form the original VIF, followed by a subordinate designator, a or b, to separate the two VIFs originally hosted by the port in forming the original VIF.

FIGS. 3 and 4 illustrate the situation where the port 22a-1 of the server 24a becomes inoperative, as illustrated by the X's marked on that port. The inoperative port 22a-1 prevents message communications to IP addresses IPAa-1a and IPAa-1b, unless the two IP addresses IPAa-1a and IPAa-1b are hosted by one or more other operative ports of the cluster 26. FIG. 3 illustrates the situation of transferring the hosting responsibility for IP address IPAa-1a from port 22a-1 to port 22a-2, while FIG. 4 illustrates the situation of transferring the hosting responsibility for IP address IPAa-1b from port 22a-1 of server 24a to port 22c-1 of the different server 24c.

In accordance with one of the basic aspects of the present invention shown in FIG. 3, the VIF formed by the port 22a-1 and the IP address IPAa-1a is transferred to the functional port 22a-2, thereby causing the functional port 22a-2 to commence hosting the IP address IPAa-1a, and thereby establish the VIF with the combination of port 22a-2 and the IP address IPAa-1a. Under this circumstance the port 22a-2 now hosts three VIFs: one VIF formed by the port 22a-2 and the IP address IPAa-2a, another VIF formed by the port 22a-2 and the IP address IPAa-2b, and the third VIF formed by the port 22a-2 and the transferred IP address IPAa-1a.

Communications addressed to the three IP addresses IPAa-2a, IPAa-2b and IPAa-1a, are received and processed by the server 24a in the same manner as occurred previously when port 22a-1 was functional. The only difference is that those communications are not serviced through port 22a-1 which has become inoperative, but instead are serviced through port 22a-2 which assumes the additional VIF arising from hosting the IP address IPAa-1a. The ability to transfer the VIF from the inoperative port 22a-1 to the operative port 22a-2 assures that communications will be preserved. Data storage service request messages arising on the transferred VIF will be handled by the same server 24a, just as they would have previously handled had the port 22a-1 remained operative.

As shown in FIG. 4, the IP address IPAa-1b is transferred from the inoperative port 22a-1 to the operative port 22c-1 of the server 24c, hereby causing the port 22c-1 to commence hosting the IP address IPAa-1b. This results in transferring the VIF to the combination of the port 22c-1 and the IP address IPAa-1b. Under this circumstance the port 22c-1 now hosts three VIFs: one VIF formed by the port 22c-1 and the IP address IPAc-1a, another VIF formed by the port 22c-1 and the IP address IPAc-1b, and the third VIF formed by the port 22c-1 and the transferred IP address IPAa-1b.

Communications addressed to the three IP addresses IPAc-1a, IPAc-1b and IPAa-1b, are received and processed by the server 24c. To service those requests addressed to the IP address IPAa-1b, the server 24c must interact with the disks 36 (see FIG. 1) associated with the server 24a (not shown in FIG. 4). Such interaction is possible because of the message communication through the cluster switching network 38 (FIG. 1), thereby allowing the server 24c to communicate with the server 24a and execute the storage service request requested by the communication, report the results of that executed action back to the server 24c, and communicate from the server 24c to the client 34 (FIG. 1) through the VIF formed by the port 22c-1 and the IP address IPAa-1b. The only difference is that the communications are not serviced through port 22a-1 which has become inoperative, but instead are serviced through port 22c-1 of server 24c, and the necessity for communication between the servers 24c and 24a.

Notice that the exemplary action represented in FIGS. 3 and 4 as transferred the hosting responsibility of the IP addresses IPAa-1a and IPAa-1b from the inoperative port 22a-1 to other operative ports of the cluster 26. As a consequence, there are no IP addresses remaining on the inoperative port 22a-1, because they have been transferred to be hosted as a part of the VIF by other operative ports. The ability to transfer of the VIFs from an inoperative port 22a-1 to operative ports 22a-2 and 22c-1 assures that communications with the cluster 26 will be preserved even upon failure of operations of the port, due to the redundancy characteristics of the servers within the cluster 26.

FIG. 5 generally illustrates the basic automatic failover configurations illustrated by FIGS. 3 and 4, and represents the preferred form of the entire automatic failover configurations for the entire cluster 26. The arrows 40b and 40c represent the attempts to transfer an IP address from the inoperative port 22a-1 on server 24a to another port on the same server 24a. As shown in FIG. 5, each server has three ports so only two attempts to transfer the VIF to other ports on the same server 24a are possible, shown by the arrows 40b and 40c. One of the attempts, shown by arrow 40b, is an attempt to transfer one or more the IP addresses previously hosted by the inoperative port 22a-1 to the operative port 22a-2. The arrow 40c represents an attempt to transfer one or more of the IP addresses from the inoperative port 22a to the operative port 22a-3 if the operative port 22a-2 is unable to accept the transfer.

If none of the other remaining functional ports, i.e. port 22a-2 and port 22a-3, on the same server 24a are available to accept the transfer of the IP address from the inoperative port 22a-1, a transfer from the server 24a to another server 24c is attempted, as shown by the arrow 42a. The arrow 42a represents an attempted transfer of one or more of the IP addresses from the failed port 22a-1 to its corresponding port 22c-1 on the server 24c. If the port 22c-1 cannot accept the VIF, a second transfer represented by arrow 42b is attempted from the failed port 22a-1 to the port 22c-2 on the server 24c. If the port 22c-2 is unable to accept the VIF, another transfer represented by the arrow 42c is attempted from the failed port 22a-1 to the port 22c-3.

If none of the ports on the server 24c accept the VIF, a transfer from the server 24a to another server 24e is attempted, as shown by the arrow 44a. The arrow 44a represents a transfer from the failed port 22a-1 to its corresponding port 22e-1 on the server 24e. If the port 22e-1 cannot accept the VIF, a second transfer represented by arrow 44b is attempted from the failed port 22a-1 to the port 22e-2 on the server 24e. If the port 22e-2 is unable to accept the VIF, another transfer represented by the arrow 44c is attempted from the failed port 22a-1 to the port 22e-3. Once all of the possible ports have been tested to accept an IP address, and none of the possible ports are available, the failover configuration reverts back to the initial starting port, as shown by arrow 45. The reversion back to the original starting port, represented by arrow 45, is based on the possibility that the original cause of interoperability of port 22a-1 may have become resolved, allowing the port 22a-1 to become functional once again. Under such circumstances, the now-operative port 22a-1 can accept and host IP addresses once again to establish VIFs at that now-operative port.

The arrows 46b-46c, 48a-48c, 50a-50c and 51 represent the same failover configurations with respect to the servers 24b, 24d and 24f as have been previously described by use of the arrows 40b-40c, 42a-42c, 44a-44c and 45 with respect to the servers 24a, 24c and 24e.

Notice that the failover configuration from one server, e.g. 24a of a server failover pair 30a is to another server of a different failover pair, e.g. 24c of the server failover pair 30b, when the cluster 26 is formed by multiple server failover pairs. The failover configuration from one server of one failover pair to another server of another failover pair is to maintain redundancy under circumstances where an incoming message to one of the ports, e.g. 22a-1 in the above examples, has caused not only the failure of the port 22a-1, but even the failure of the entire server 24a. In that circumstance if the failover configuration was from the server 24a to 24b, there is a strong likelihood that the same failure-creating message would be received by the transferred VIF on the server 24b, and would cause a similar failure of the server 24b. With both servers 24a and 24b rendered inoperative, the redundancy advantages of servers 24a and 24b of the server failover pair 30a would be lost, because both servers of that server failover pair would be inoperative.

Transferring the VIF from one server of one server failover pair to another server of a different server failover pair avoids the possibility that an incoming message will cause inoperability of both servers of a server failover pair. It is for this reason that the failover configuration represented by the arrows 40b-40c, 42a-42c, 44a-44c and 45 interact with only one server of each server failover pair, while the failover configuration represented by the arrows 46b-46c, 48a-48c, 50*a*-50*c* and 51 interact with the other server of each server failover pair. If the cluster 26 is formed by a single server failover pair, it is then necessary to failover one of the servers of the single server failover pair to the other server of that single server failover pair.

If none of the ports 22 of the cluster 26 are available to host the VIF under a first application of the above-described failover configurations, one or more subsequent attempts may be made to transfer the VIF, as represented by the arrows 45 and 51. The possibility that one of the previously inoperative ports, or a port which previously had maximum capacity for hosting VIFs, may have become available or may have reduced its load, so that it can now accept responsibility for hosting the IP address of the failed node.

If the attempts at transferring the VIF using this failover configuration are unsuccessful, none of the ports 22 is available to accept the VIF of the failed port, and the VIF cannot be transferred because no other port is available. Under such circumstances, the VIF is simply no longer available for use. However, the likelihood of an unsuccessful transfer a VIF in the cluster 26 is remote, because of the relatively large number of ports 22 available in a typical cluster 26, and the fact that additional capacity is generally accommodated by the ports of the servers in the cluster to assure redundancy.

The arrows 40*b*-40*c*, 42*a*-42*c*, 44*a*-44*c* and 45 and the arrows 46*b*-46*c*, 48*a*-48*c*, 50*a*-50*c* and 51, shown in FIG. 5, represent a two ring failover configuration among all of the ports 22 and servers 24 of the cluster 26. Each ring failover configuration involves only one of the servers 24 of each server failover pair within the cluster 26. The term "ring" is used herein to represent the servers and ports within the cluster 26 among which the sequence of failover configuration rules are executed, and as such, is distinguishable from, and not meant to imply correspondence or relation to, a ring, bus, tree or other topology commonly used to describe the connectivity of nodes in a local area or other type of conventional network.

Based on the examples described above in conjunction with FIGS. 2-5, the complete failover configuration among the ports and servers can be divided into a server subpart failover configuration and a port subpart failover configuration. The server subpart failover configuration is illustrated by the arrows 42*a*, 44*a* and 45 which link the first servers (as shown) in each server failover pair 30*a*, 30*b* and 30*c*, and by the arrows 48*a*, 50*a* and 51, which link the second (as shown) servers 24 in the same failover pairs. The arrows 42*a*, 44*a* and 45 illustrate the establishment of one ring which encompasses each corresponding server of each server failover pair, and the arrows 48*a*, 50*a* and 51 illustrate the establishment of another ring which encompasses a different server of each server failover pair. The two rings established by the server subpart failover configurations encompass every server in the server failover pairs in the cluster. The port subpart failover configuration is represented by the arrows 40*b*, 40*c*, 42*b*, 42*c*, 44*b* and 44*c* for ports of the servers in one ring, and by the arrows 46*b*, 46*c*, 48*b*, 48*c*, 50*b* and 50*c* for the ports of servers in the other ring. The port subpart failover configurations represent the circumstance of attempting to transfer the VIF to each port on the same server before progressing to the ports of the next server in the ring.

The actual progress of the failover configuration begins with invoking the port subpart failover configurations on the server which experiences the inoperative port in the first instance, referred to as the originating server. An example of this circumstance is represented by the arrows 40*b* and 40*c*. Next, if none of the ports on the originating server are available, the server subpart failover configuration are invoked represented by the arrow 42*a*, followed by invoking the port subpart failover configuration represented by the arrows 42*b* and 42*c*. Following that, if none of the ports on that server are available, the server subpart failover configuration is invoked represented by the arrow 44*a*, which is again followed by invoking the port subpart failover configuration represented by the arrows 44*b* and 44*c*. If none of these ports are available, the server subpart failover configuration represented by the arrow 45 is invoked, thereby returning the overall failover configuration rules to the starting point and resulting in a determination that the VIF could not be hosted on another port within the cluster. A similar progress occurs with respect to the arrows 46*b*, 46*c*, 48*a*, 48*b*, 48*c*, 50*a*, 50*b*, 50*c* and 51, with respect to the other ring of servers.

Figure 6:
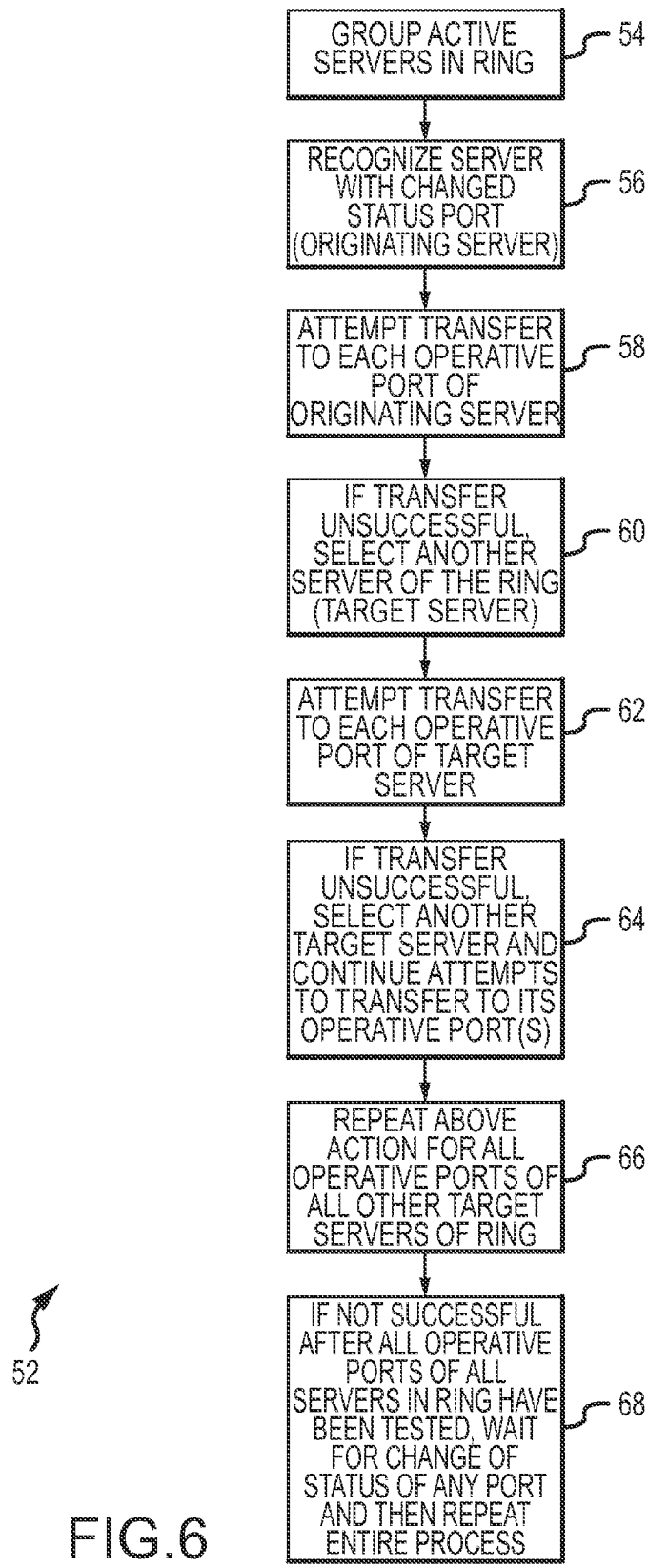
FIG. 6 is a generalized sequence diagram of the basic failover configuration rules of the present invention, which are also shown graphically in FIG. 5.

The failover configuration rules represented by the arrows in FIG. 5 may be summarized by the sequence 52 shown in FIG. 6. At 54, the active servers of a ring are grouped together. Notice that in FIG. 5, the arrows 42*a*, 44*a*, and 45 define one ring formed by servers 24*a*, 24*c* and 24*e*, while the arrows 48*a*, 50*a* and 51 define another ring formed by the servers 24*b*, 24*d* and 24*f*. Although the sequence 52 shown in FIG. 6 is explained in terms of one ring, the same sequence 52 applies to each ring of the cluster. Next, as shown at 56, the server within the ring that undergoes a change in status of a port is recognized as the originating server, because it is from the server that the IP addresses associated with the port which undergoes a change of status will be transferred. Port 22*a*-1 is the port which undergoes a change of status as shown in FIGS. 3-4. An attempt to transfer to the IP address of the changed status port occurs at 58, as shown in FIG. 6. The IP address from the changed status port of the originating server is attempted to be transferred to other operative ports on that originating server. This action is represented by the arrows 40*b* and 40*c*, or the arrows 46*b* and 46*c*, shown in FIG. 5.

If the transfer of the IP address to another operative port on the originating server is unsuccessful, as indicated at 60 in FIG. 6, another server of the ring is selected. The other server of the ring is regarded as a target server. A target server is not the originating server in the ring. In the example shown in FIG. 5, the first selected target server is server 24*c*. Next as shown at 62 in FIG. 6, an attempt is made to transfer the IP address to the operative ports of the first selected target server. The attempted transfers illustrated in FIG. 5 by the arrow 42*a* to the active port 22*c*-1, the arrow 42*b* to the active port 22*c*-2, and by the arrow 42*c* to the last active port 22*c*-3 of the target server 24*c*.

If the IP address is not successfully transferred to an operative port on the first target server, the next target server in the ring is selected and continued attempts are made in the same manner to transfer the IP address to the operative ports of that second target server. This action is represented at 64 in FIG. 6. The action is continued until all of the operative ports of the remaining target servers of the ring have been tested to accept the transfer, as represented at 66. If the IP address has not been transferred after all of the operative ports of all of the servers of the ring have been tested, the sequence 52 waits for change in status of any port of any server of the cluster, and then repeats the entire process shown in FIG. 6, with the expectation that the change in status of any of the operative ports of the active servers might create an opportunity for transferring the IP address. This later functionality is illustrated at 68 in FIG. 6.

Of course, once one of the IP addresses from an inoperative port is successfully transferred, the entire sequence 52 shown in FIG. 6 is repeated for any other IP addresses which must be transferred from the inoperative port.

The functionality described above in conjunction a previously-operative port becoming inoperative also applies with respect to a previously-operative server becoming inoperative, as might occur from hardware, software or communication delay problems. In the circumstance of a previously-operative server becoming inoperative, all of the ports associated with the now-inoperative server become inoperative, resulting in the described transfer of the VIFs. In the case of a previously-inoperative server becoming operative, or the case of a previously-inoperative port becoming operative, the same functionality is executed to transfer each IP address hosted by a different port back to the port to which that IP address was originally assigned. In such circumstances, the IP address(es) originally assigned to a now-operative port will not be accepted by any other operative ports of the servers other than the originally assigned port, once the port to which that IP address was originally assigned becomes operative. Thus, any attempts to transfer an IP address to a port which was not originally programmed to host that IP address will be rejected under circumstances where the port which was originally programmed to a host that IP address is operative. In this manner, the distribution of the VIFs among the ports of the cluster will be reestablished after a previously-inoperative server or port becomes operative. Of course, the initial equal distribution of VIFs is originally established by the original assignment of VIFs among the ports and servers of the cluster. The automatic reconfiguration capability of the present invention reestablishes that initial equal distribution to the extent possible after some adverse event has disturbed that initial equal VIF distribution by causing the transfer of an IP address to a port which is different from the initially programmed hosting port.

Figure 7:
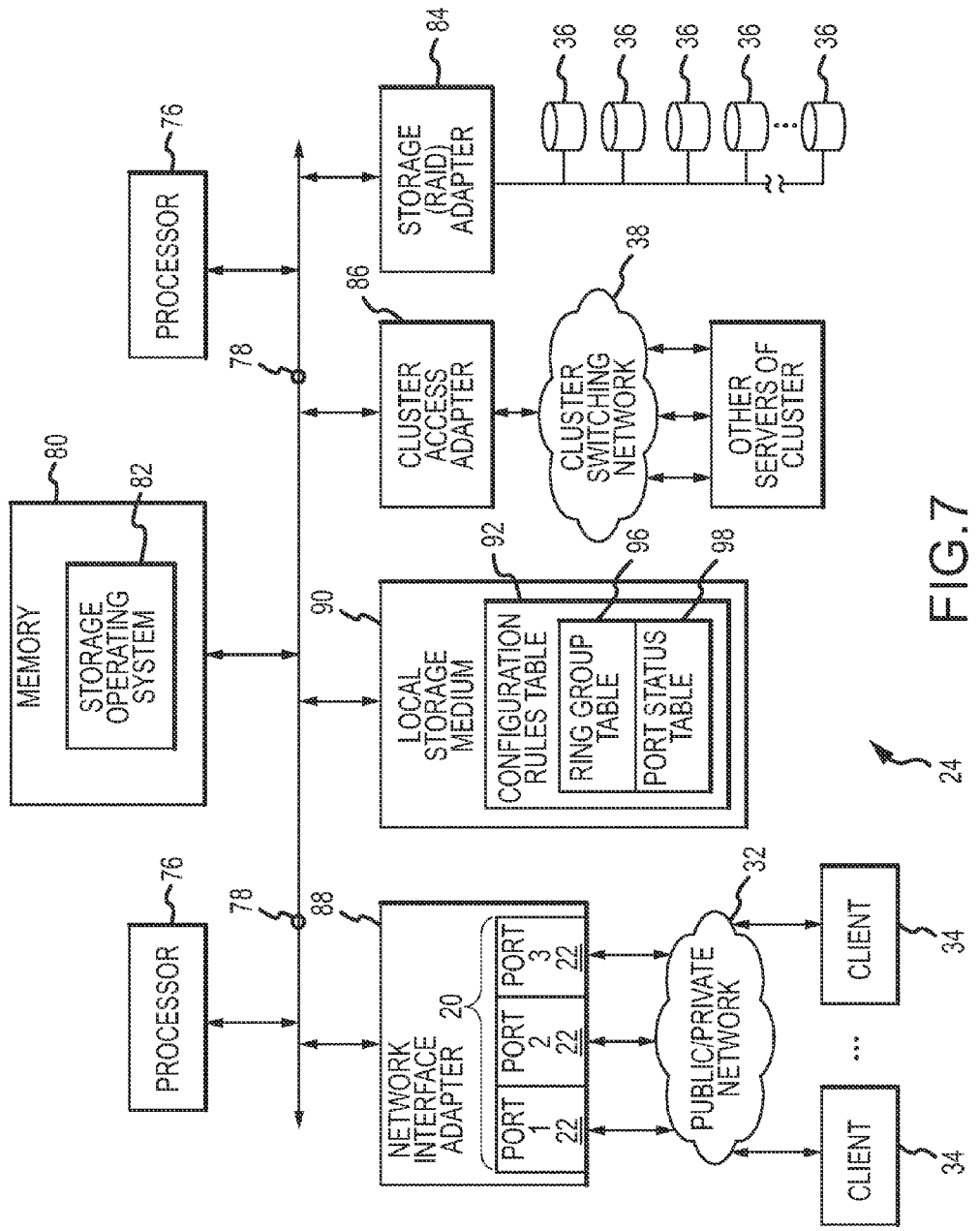
FIG. 7 is a generalized block diagram of an exemplary server of the mass storage data system shown in FIG. 1.

The manner of executing the automatic failover configurations shown in FIGS. 5 and 6 utilizes the servers of the mass data storage system, a representative one of which is shown in FIG. 7. The server 24 includes one or more conventional processors 76 connected to a bus 78. A memory 80 is also connected to the bus 76. The memory 80 contains a set of instructions for the processors 76 which constitute a storage operating system 82. Executing the instructions of the storage operating system 82 causes the processors 76 to perform the mass data storage service functions generally and specifically, to execute the failover configurations and transfer the VIFs as described herein.

A storage adapter 84 is also connected to the bus 78 and is controlled by the instructions executed by the processor(s) 76 to accomplish read and write operations with respect to the disks 36. The storage adapter 84 is instrumental in invoking the RAID functionality of the disks 36. A cluster adapter 86 is also attached to the bus 78 and is also controlled by the instructions executed by the processor(s) 76. The cluster adapter 86 is connected to the cluster switching network 38. It is through the cluster adapter 86 and the cluster switching network 38 that the cluster level management of networked communications between the individual servers 24 of the cluster 26 (FIG. 1) is achieved.

A public or private access computer communication network interface adapter 88 is also attached to the bus 78. The network interface adapter 88 creates the ports 22. Messages between the server 24 and the clients 34 are transmitted over the computer communication network 32 and received and transmitted at the ports 22. Each of the ports 22 typically hosts at least one IP address, as discussed above, and in doing so becomes a VIF. All of the VIFs for the ports 22 are generally referenced collectively at 20.

In general terms, and as is also described in the above referenced US patent applications incorporated herein, the storage operating system 82 separates the functional capability into a module which handles communications with the clients 34 over the public or private network 32 and with the other servers of the cluster through the cluster switching network 38. This module is referred to as an "N module" in the products of the assignee hereof. Another module, known as the "D module" in the products of the assignee hereof, controls the execution of the read and write requests to and from the disks 36 or other mass data storage media for which the D module is responsible. The N module receives requests from clients for file system access to the mass data storage media, parses requests to determine whether they are applicable to the N or D modules, translates any request into the language employed by the storage operating system 82 to effect the request, and determines which of the D modules to which to transfer the request over the cluster switching network 38, and transfers that request. The D module to which the request is addressed receives the request and performs the actions specified by the request with respect to the mass data storage medium over which it has responsibility. Execution of the failover configuration rules in the manner described herein is accomplished by communication using the same cluster switching network 36 is used for communications between the N and D modules.

A local storage medium 90 is also connected to the bus 78. The local storage medium may be, for example, a hard disk drive, or some other media for storing information. Some of the information stored on the local medium 90 constitutes a configuration rules table 92 which defines, among other things, the status of every port 22 of every server 24 in the cluster 26. Those ports which are functional are designated in the configuration rules table 92 as being "in quorum," because those ports are available to host IP addresses and become VIFs. A "heartbeat" or other continuously periodic status message is communicated by the servers 24 over the cluster switching network 38 to identify those ports 22 which are functional, from which it is possible to recognize those ports 22 which are inoperative and therefore "out of quorum." The configuration rules table 92 maintains a continuously updated list of those functional ports 22 which are in quorum and therefore available to host IP addresses as VIFs. The configuration rules table 92 also maintains a listing (not shown) of the ports to which the IP addresses were initially or originally assigned on an equal distribution basis. The initial port assignment information is used to transfer the IP addresses back to the original hosting ports and reestablish the initially-programmed equal distribution of VIFs, after any of the original hosting ports or servers return to an operative condition after having been in an inoperative condition. The configuration rules table 92 provides the configuration rules which define the attempted transfers represented by the arrows shown in FIGS. 3-5.

As discussed above, the configuration rules may be divided into subpart of server configuration rules and a subpart for port configuration rules. The server subpart of the configuration rule set 92 is formed by a table 96 which identifies a group of active servers that form the ring for purposes of transferring the IP addresses from one server to the next, as discussed above. When the cluster 26 is formed by multiple server failover pairs, the table 96 identifies two rings of active servers, with one ring of active servers formed by one of the servers of each server failover pair and with the other ring of active servers formed by the other server of each server failover pair, as discussed above. The port subpart of the configuration rule set 92 is formed by a table 98 which identifies the functional status of all of the ports of each server of the cluster and the IP addresses that are hosted by each of the functional ports. Reference to the port status table 98 is used in implementing the configuration failover rules to avoid attempting to transfer a VIF to a port of a server which is inoperative.

Whenever a new server joins the cluster, that information is added to the table 96, as a result of the continuous heartbeat status message indicating the presence of a new server in the cluster. Adding the new information to the table 96 allows that new server to be joined into one of the rings. A similar situation exists for the addition of more ports associated with a server. Newly added functional ports are added to the information contained in the table 98. Furthermore, whenever a server becomes inoperative, or one of the ports of the server becomes inoperative, that fact is also reflected very quickly by the continuous heartbeat status messages, and the tables 96 and 98 are rapidly updated. As a consequence, the information contained in the tables 94 and 96 quickly identifies any port or ports which are no longer capable of VIF functionality, and requiring that the VIF be transferred to another available port of a server in the cluster. A change in status of the ports also invokes the functionality of the present invention in automatically adjusting the failover configuration to accommodate the changed status. Note that if a server becomes inoperative, its ports also become inoperative.

An example of the ring group table 96 is shown in FIG. 8, using the cluster 26 shown in FIG. 5 as an example. The ring group table 96 illustrates that the servers 24a, 24c and 24e form one ring, and the status of each of the servers in that ring is operative. The operative status is shown by an "1" in FIG. 8, and an inoperative status would be shown by a "O" (not shown). The ring group table 96 also shows that a second ring is formed by the operative servers 24b, 24d and 24f. Upon each additional server failover pair joining the cluster, one of the servers of that joining server failover pair is added to one of the ring groups and the other server of that joining server failover pair is added to the other ring group. Similarly, if any one of the servers of a ring group becomes inoperative, its status will be changed in the ring group table 96 to inoperative and that inoperative server will not be included in the ring group for purposes of automatically adjusting the failover configuration. It is in this manner that additional servers are automatically added to each ring, and servers that were previously operative within each ring can be dropped out of the ring if they become inoperative.

An example of a port status table 98 is shown in FIG. 9. The port status table 98 identifies each port for each server in the cluster, and correlates each port to the server upon which it resides. The operative status of each port is also illustrated in the table 98. An operative status as shown by an "X", and an inoperative status is shown by a "O." Consistent with the example described above in connection with FIG. 5, all of the ports of the cluster are operative except for the port 22a-1. The information in the port status table 98 is used when performing the port configuration subpart of the configuration rules. Any port which becomes inoperative is quickly updated in the port status table 98 by the continuous heartbeat status messages, and any new ports which become available to host IP addresses, and thereby become VIFs, are added to the port status table 98 upon the server joining the cluster, as represented by the servers joining the ring groups shown in the table 96 (FIG. 9), or as a result of a previously inoperative port becoming operative.

The functionality in automatically adjusting the failover configuration in accordance with the present invention is distributed among all of the servers in the cluster. Any server which experiences an inoperative port assumes the responsibility for attempting to transfer each VIF associated with the failed port to another operative port. The other servers of the cluster assume responsibility for attempting to transfer each VIF associated with the failed ports of an inoperative server. A server which becomes operative and joins a ring after having previously been inoperative assumes the responsibility for transferring each VIF back to itself. Each server 24 (FIG. 8) executes the instructions contained in the storage operating system 82 while using the information contained in the configuration table 92 to automatically adjust and reconfigure the operative ports with the IP addresses to accommodate the change in status in accordance with the configuration rules.

Figure 10A:
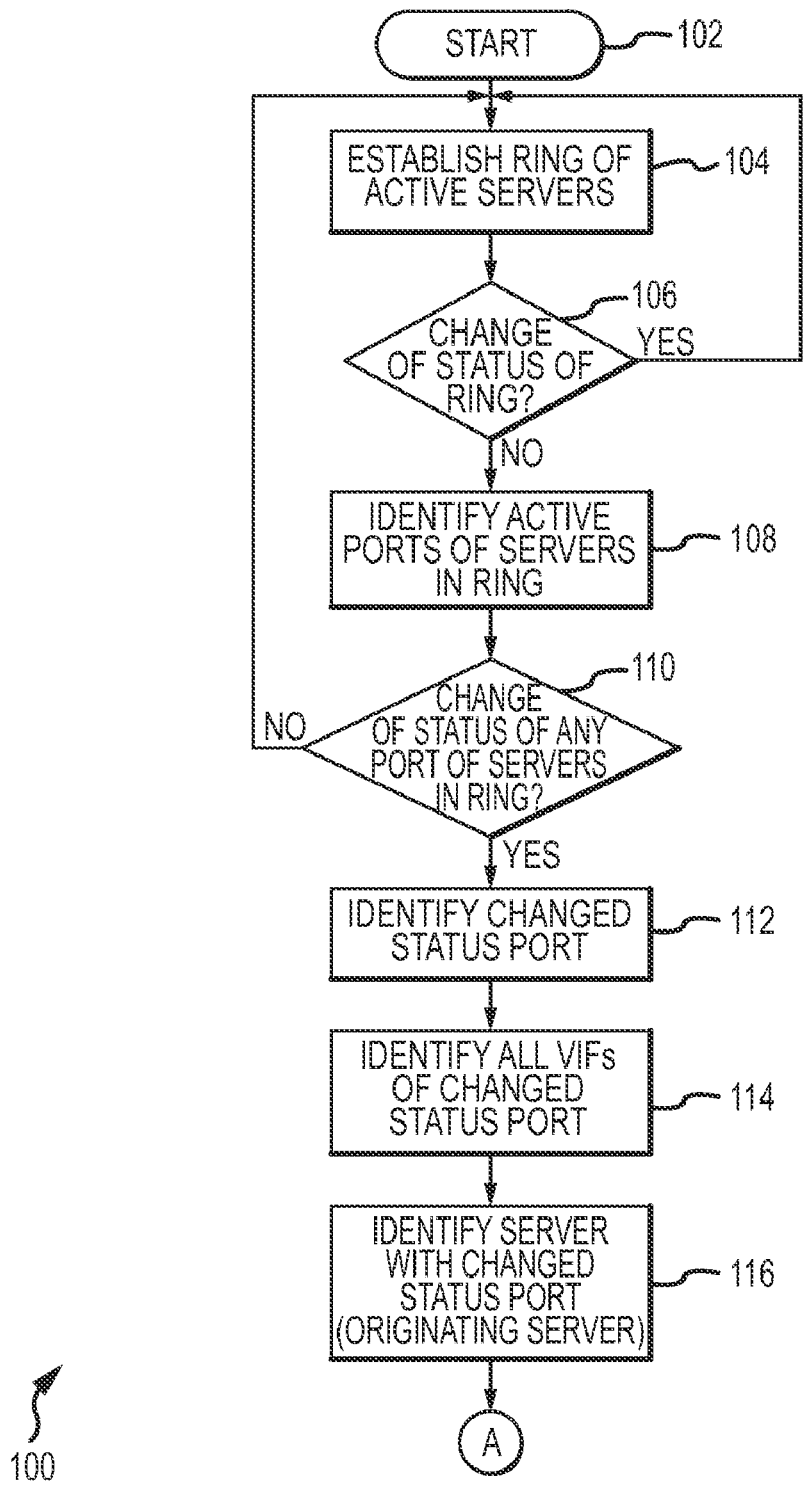
FIGS. 10A, 10B and 10C form a single unified flowchart of the process of performing the functions involved in automatically establishing and executing the failover configuration rules illustrated in FIGS. 3-6.
Figure 10B:
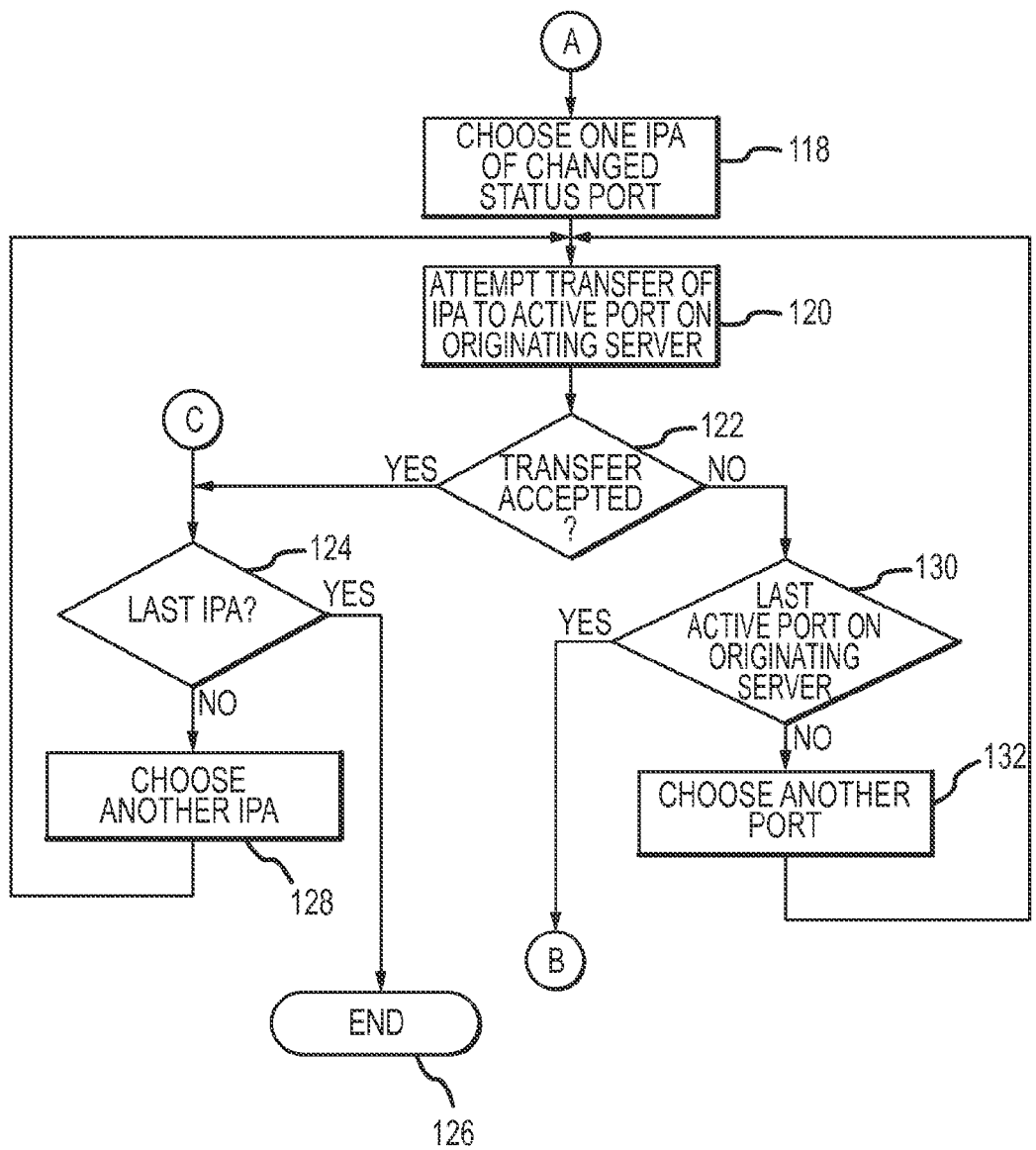
Figure 10C:
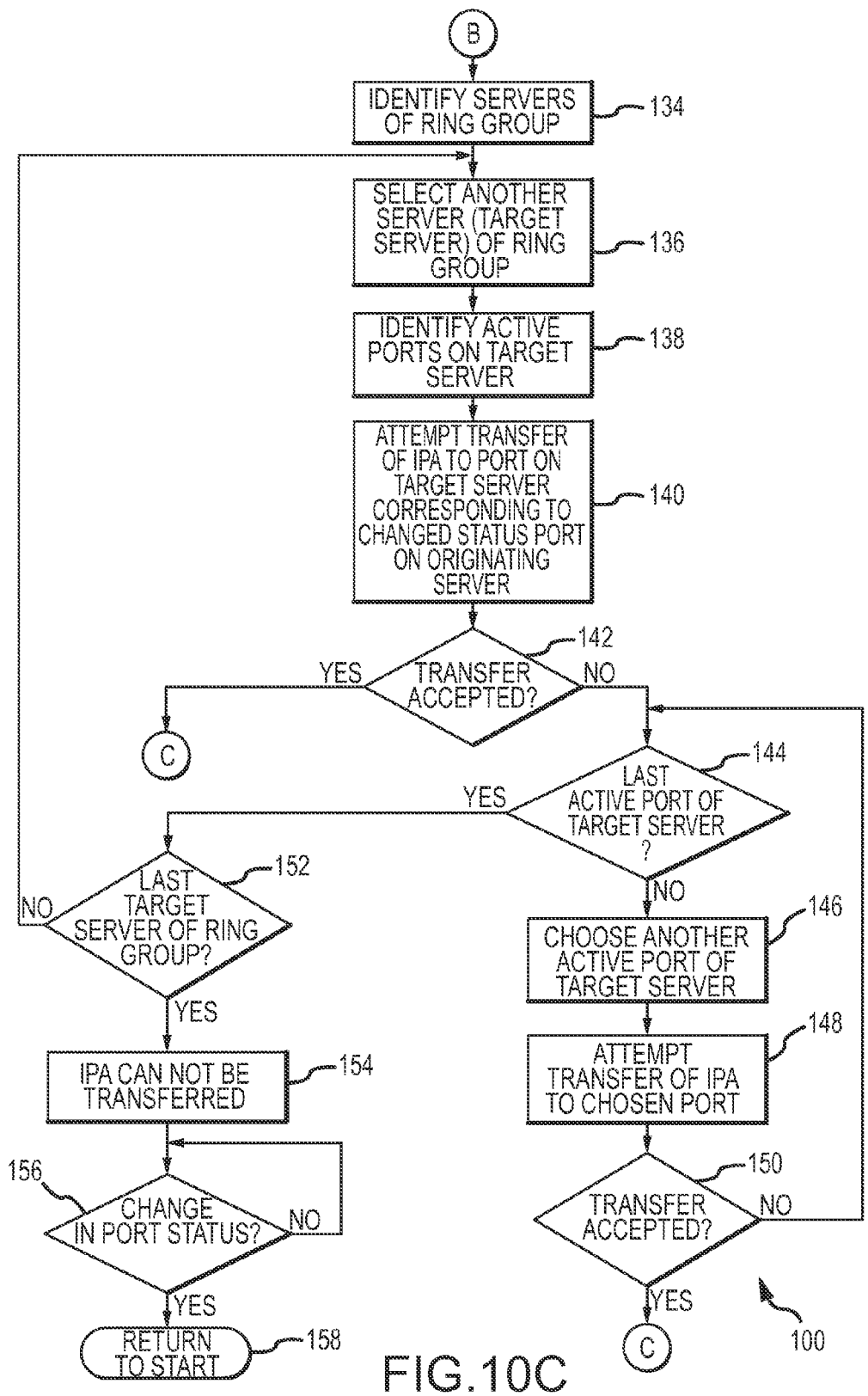

The process flow executed to automatically adjust the failover configuration is shown in FIGS. 10A, 10B and 10C. The process flow 100 starts at 102, shown in FIG. 10A. A ring of active servers within the cluster 26 (FIG. 1) is next established at 104, by reference to the ring group table 96 (FIGS. 7 and 8). A change of status of the ring established at 104 is monitored at 106. A change of status at 106 would occur as a result of a server becoming inoperative, as would occur from a hardware or software malfunction or if communications cannot be established with the server through a heartbeat status message, or as a result of an additional server becoming operative, as would occur when a newly operative server joins the cluster. The determinations at 104 and 106 permit adding or subtracting new servers to each ring or group of servers established. The determinations at 104 and 106 are based on the information contained in the ring group table 96 (FIG. 9).

Once a ring of active servers has been established at 104, and when the status of the ring does not change as determined at 106, all of the active ports of the servers in the ring are identified at 108, based on information contained in the port status table 98 (FIGS. 7 and 9). At 110, the status of all of the identified active ports of the servers in the ring is monitored for any change. So long as there is no change in the active port status, as determined by the negative determination at 110, there is no need to change any VIF assignment or hosting responsibility within the servers of the ring. The process flow therefore reverts back to 104, and a continuous loop is thereafter established through the actions designated at 104, 106, 108 and 110.

However, once the status of any port of any active server in the ring changes, as established by an affirmative determination at 110, there is a need to change the VIF assignment or hosting capability within the servers of the ring. A change of status indicates that one of the ports is no longer active, or a previously inactive port has become operative. In the case of an active port which has become inoperative, the VIFs associated with the inactive port must be hosted by other active ports of the ring. In the case of a previously inactive port which has become operative, the newly active port is able to accept VIF hosting responsibility from some of the other ports which may have an excessive load of communication traffic.

A change of status of any port of a server in the ring, as determined at 110, next results in identifying the changed status port, at 112. Thereafter all of the VIFs hosted by the changed status port are identified and determined at 114. The server upon which the changed status port is located is next identified at 116. The information which is identified at 112, 114 and 116 is present in and/or added to the port status table 98 (FIG. 9). Again, the information used to populate the tables 96 and 98 (FIGS. 8 and 9) is obtained by a continuous communication of status messages among the servers in the cluster.

The server which has a port that has undergone a change in status is designated in the process flow 100 as an originating server. It is the originating server which originates the activity of automatically changing or readjusting the failover configuration in accordance with the present invention.

The process flow 100 shown in FIG. 10A moves from 116 to 118 shown in FIG. 10 ft as indicated by the common reference point A. At 118, shown in FIG. 10B, one Internet protocol (IP) address (IPA) hosted by the changed status port is chosen. The IP address chosen at 118 is selected from one of the IP addresses hosted by the changed status port as shown in the port status table 98 (FIG. 9). An attempt is thereafter made at 120 to transfer the chosen one of the IP addresses previously hosted by the changed status port to a new port on the originating server. If the attempt is successful, as indicated by an affirmative determination at 122, the VIF associated with the IP address is now hosted by another active port on the originating server.

Next, at 124, it is determined whether any additional IP addresses hosted by the inoperative port must be transferred. If there are no other IP addresses which must be transferred, the process flow 100 ends at 126. An affirmative determination at 124 indicates that all of the IP addresses previously hosted by the inoperative port have been successfully transferred. It is under these circumstances that the process flow 100 ends at 126.

A negative determination at 124 indicates that there are other IP addresses to be transferred from the inoperative port, and the negative determination at 124 results in choosing another IP address at 128. The choice is among the other IP addresses that were hosted by the change in status port, as shown by the information in the port status table 98 (FIG. 9). After choosing another one of the IP addresses, the process flow reverts back to 120, where a transfer of the chosen IP address is attempted. The transfer attempted at 120 is to the originating server. The process flow represented at 122, 124 and 128 continues until all of the IP addresses originally hosted by the inoperative port have been accepted by other ports on the originating server, indicated by an affirmative determination at 124, or until none of the ports on the originating server are available to accept the IP address, as determined at 130.

A negative determination at 122 indicates that the attempted transfer at 120 was not successful to the chosen port. The next following determination at 130 is whether the active port which was the target of the unsuccessful transfer attempt is the last available port on the originating server. A negative determination at 130 indicates there are still available ports on the originating server to which to attempt to transfer the IP address. Another one of those available ports is chosen at 132, following the negative determination at 130, and then the process flow reverts back to 120 to attempt to transfer the IP address to another port on the originating server.

The process flow represented by a negative determination at 130, and at 132, 120 and a negative determination at 122 continues until all of the active ports on the originating server have been the target of an attempted IP address transfer. Once all of the active ports on the originating server have been the target of a transfer attempt, there are no further ports which are available, resulting in an affirmative determination at 130. The process flow 100 shown in FIG. 10B moves from 132 to 134 shown in FIG. 10C, as indicated by the common reference point B.

As has been described in conjunction with FIG. 10B, the port assignments for the IP addresses of the inoperative port are first attempted to be transferred to operative ports of the originating server. In the instance where one of the IP addresses cannot be successfully transferred to an active port on the originating server, it is thereafter assumed that no further transfers to ports on the originating server will be possible. Under those circumstances, the process flow begins to attempt the transfers to other servers in the ring group, known as target servers. These subsequent actions are illustrated by the process flow 100 shown in FIG. 10C.

The process flow 100 arrives at 134, shown in FIG. 10C, after all of the ports of the originating server have been tested and have been found unavailable for the purpose of accepting the transfer of an IP address. At 134, the servers in the ring group are identified. This indication is made from the information contained in the ring group table 96 (FIG. 8). Thereafter at 136, a target server from the ring group is selected. A target server is one of the servers of the ring group other than the originating server. The active ports on the target server are next identified at 138. At 140, an attempt is made to transfer the IP address to the corresponding port on a selected target server. The corresponding port on the selected target server is that port which occupies a corresponding position or identification to the inoperative port of the originating server. For example, port 22*c*-1 on server 24*c* corresponds to the inoperative port 22*a*-1 on server 24*a*. If there is no corresponding active port on the selected target server, the action at 140 is performed with respect to any one of the active ports on the target server.

An affirmative determination at 142 indicates if the attempted transfer at 140 was successful. If so, the program flow 100 moves to 124 shown in FIG. 10B, as indicated by the common reference point C. Moving the program flow 100 to 124 results in again determining whether additional IP addresses must be transferred, in the manner previously described. So long as there is an additional IP address which must be transferred, the program flow 100 continues as previously described.

A negative determination at 142 indicates that the chosen port of the target server would not accept the transfer of the IP address. The following determination at 144 is to determine whether there are other active ports on the target server which should be tested for accepting the IP address. So long as there are other active ports which have not been tested previously, a negative determination results at 144. Another active port on the target server is thereafter chosen at 146, followed by an attempt to transferred the IP address to that chosen port at 148. If the transfer was accepted, as indicated by an affirmative determination at 150, the process flow 100 reverts to 124, shown in FIG. 10B and indicated by the common reference point C.

A negative determination at 150 indicates that the chosen port on the target server could not accept the transfer of the IP address. Thereafter, the process flow 100 reverts to 144, where a continued negative determination indicates that other ports are available on the target server to which to attempt to transfer the IP address. Another one of those available ports is chosen at 146, followed by an attempt to transfer the IP address to that chosen port at 148, followed by a determination at 150 as to whether the transfer was successful.

If none of the ports on the chosen target server have accepted the IP address, an affirmative determination at 144 indicates that there are no further active ports on the target server which are available for an attempted transfer. An affirmative determination at 144 therefore leads to another determination at 152. If the chosen target server is not the last potential target server in the ring, as indicated by a negative determination at 152, the process flow 100 reverts to 136 where the process flow continues in the manner described for the next selected target server in the ring. All of the available ports on the next selected target server are tested in the manner described, until the IP address is accepted by one of those ports, or until none of those ports are available to host the IP address. Thereafter, the determination at 152 iterates the process flow 100 to the next target server of the ring, where the process continues.

Once all of the target servers of the ring have been tested to accept an IP address, and if none of the ports of all of the target servers are available to host the IP address, an affirmative determination results at 152. The affirmative determination at 152 results in recognition at 154 that the IP address simply cannot be hosted on any of the ports of any of the servers in the ring. Under such circumstances, there will be no VIF available on the cluster, because there is no available port on any of the servers in the ring of that cluster to host the IP address.

Recognizing that a previously unavailable port may become available as a result of that port becoming operative, the process flow 100 enters a determination at 156 to determine whether the status of any port changes. A negative determination at 156 creates a wait loop. When a change of status does occur, as represented by an affirmative determination at 156, the process flow returns at 158 to the start 102 (FIG. 10A), to reexecute the entire process flow 100. Reexecuting the entire process flow 100 in the manner described in response to a change of status of a port will result in a second attempt to create VIF by transferring the IP address to an available port on one of the ports of the servers in a ring of the cluster. Waiting for a change in port status before again executing the entire process flow 100 attempts as quickly as possible to create a VIF for any IP address that has not previously been hosted. The reason to reexecute the entire process flow 100 is that the capacity or availability of a port which was previously unavailable might have become available for use.

As has been described above, failover configurations for VIFs are automatically established and adjusted in accordance with the present invention. The automatic reconfiguration achieves the best redundancy and equal VIF distribution among the available ports, thereby enhancing the performance of mass data storage clusters and systems. The automatic aspects are achieved without manual programming, and only by enabling the automatic failover functionality. The substantial difficulties of manually reprogramming failover configuration rules are avoided. Adjustments in the size of the cluster by changing the number of servers and server failover pairs in the cluster are also automatically accommodated.

The significance of these and other improvements and advantages will become apparent upon gaining a full appreciation of the ramifications and improvements of the present invention. Preferred embodiments of the invention and many of its improvements have been described with a degree of particularity. The detail of the description is of preferred examples of implementing the invention. The detail of the description is not necessarily intended to limit the scope of the invention. The scope of the invention is defined by the following claims.

The invention claimed is:

1. A method of reconfiguring virtual interfaces on a cluster formed by a plurality of servers in a mass data storage system; wherein each server includes a port for interfacing to a computer network for communicating data service requests, each virtual interface is formed by an operative port which hosts an internet protocol (IP) address used in communicating the data service requests on the computer network, the servers of the cluster are interconnected in server failover pairs, the cluster includes multiple server failover pairs, each server is connected to at least one data storage unit by which to perform the data service requests communicated on operative ports attached to the server, and each server of each server failover pair is interconnected to the data storage unit of each other server of the server failover pair to enable either server of the server failover pair to perform data service requests with respect to the data storage unit connected to either server of each server failover pair; the method comprising:

establishing two groups of operative servers of the cluster, each of the two groups including a different one of the two servers from each server failover pair;

communicating status messages among all of the servers of each group which indicate the operative status of each server within the corresponding group and each port of each server within the corresponding group;

establishing a list for each group of servers describing operative ports of each server of the group;

recognizing a change in operative status of any port of any server of each group from the status messages; and transferring the IP address from one port of the one server with the change in operative status to another operative port of one server within the same group in response to recognizing the change in operative status, whereby the server to which the IP address is transferred is not the other server of the server failover pair which includes the server having the port with the change in operative status.

2. A method as defined in claim 1, wherein each server of each group includes a plurality of ports, and the server which has the port that undergoes the change in operative status is designated as an originating server, and the method further comprises:

transferring the IP address from one port to another operative port of the originating server in response to recognizing the change in operative status.

3. A method as defined in claim 1, wherein the server which has the port that undergoes the change in operative status is designated as an originating server and each server within the same group as the originating server other than the originating server is designated as a target server, and the method further comprises:

transferring the IP address from one port of the originating server to an operative port of a target server in response to recognizing the change in operative status.

4. A method as defined in claim 1, wherein the port of the server which undergoes the change in operative status becomes inoperative and is designated as the changed status port, the server which has the changed status port is designated as an originating server, the originating server includes a plurality of ports, and each server within the same group as the originating server other than the originating server is designated as a target server, and the method further comprises:

attempting to transfer the IP address from the changed status port to another port of the originating server in response to the change in operative status; and when the attempted transfer from the changed status port to another port on the originating server is unsuccessful, attempting to transfer the IP address from the changed status port of the originating server to an operative port of one target server.

5. A method as defined in claim 4, further comprising:

continuing attempting to transfer the IP address from the changed status port of the originating server to an operative port of each target server within the same group as the originating server until the attempted transfer is successful.

6. A method as defined in claim 4, further comprising:
attempting to transfer the IP address from the changed status port of the originating server to each other operative port of the originating server before attempting to transfer the IP address from the changed status port of the originating server to an operative port of any target server.

7. A method as defined in claim 6, wherein all of the servers within the same group as the originating server include a plurality of ports, and the ports of each of the servers of the same group as the originating server have generally corresponding relationships with the ports of the other servers of the same group, and the method further comprises:
attempting to transfer the IP address from the changed status port of the originating server to the corresponding operative port of the target server before attempting the transfer to another operative port of the target server.

8. A method as defined in claim 7, further comprising:
attempting to transfer the IP address from the changed status port to all of the operative ports of each target server before attempting the transfer to a different target server.

9. A method as defined in claim 1, further comprising:
recognizing the change in operative status of a port resulting from the port becoming inoperative; and
transferring the IP address from the inoperative port to an operative port of a server within the same group as the server with the inoperative port.

10. A method as defined in claim 9, wherein each server includes a plurality of ports, and the method further comprises:
transferring the IP address from the inoperative port on one server to an operative port on the same server when the same server has an operative port in addition to the inoperative port.

11. A method as defined in claim 1, further comprising:
recognizing the change in operative status of a port resulting from a previously inoperative port becoming newly operative; and
transferring an IP address from a port to the newly operative port.

12. A method as defined in claim 1, further comprising:
recognizing the change in operative status of a port resulting from a reduction in the amount of communication traffic to the that port; and
transferring an IP address from an operative port to the port which undergoes a reduction in the amount of communication traffic.

13. A method as defined in claim 1, wherein the servers of the cluster are interconnected by a cluster switching network for communicating data service requests among all the servers of the cluster, and each server is connected to at least one data storage unit by which to perform the data service requests communicated on operative ports attached to the server, and the method further comprises:
communicating data service requests through the cluster switching network from the server having the operative port to which the IP address has been transferred to the server to which the data storage unit which is accessed to perform the data service requests.

14. A method of reconfiguring virtual interfaces on a cluster formed by a plurality of servers in a mass data storage system, wherein each server includes a port for interfacing to a computer network for communicating data service requests, each virtual interface is formed by an operative port which hosts an internet protocol (IP) address used in communicating the data service requests on the computer network, and each server performs the data service requests, the method comprising:
establishing pairs of servers from the plurality of servers to operate as server failover pairs;
establishing a first group of servers within the cluster by recognizing one server from each server failover pair which has at least one operative port;
establishing a second group of servers within the cluster by recognizing the other server within each server failover pair which has at least one operative port;
recognizing a change in operative status of any port of any server of either the first or second group; and
transferring the IP address from one port of one server of one of the first or second groups to another operative port of one server of the one group in response to the change of operative status, without transferring the IP address from the one server to the other server within the same failover pair.

15. A mass data storage system for communicating data service requests with client computers over a computer network, comprising:
a plurality of servers organized in a cluster, each server including at least one port for interfacing with the computer network by which to communicate the data service requests between the server and the client computers, at least one port of each server hosting an internet protocol (IP) address used in communicating the data service requests on the computer network, each server also including at least one data storage unit by which to perform the data service requests communicated on each operative port attached to the server, the servers are interconnected in server failover pairs, the cluster includes multiple server failover pairs, and each server of each server failover pair is interconnected to the data storage unit of each other server of the server failover pair to enable either server of the server failover pair to perform data service requests with respect to the data storage unit connected to either server of each server failover pair;
each server further including at least one processor and a memory unit which includes operating instructions for performing the data service requests;
the memory unit of each server further including a configuration rules table containing information defining the operative status of servers in the cluster and information defining the operative status of each port of each server in the cluster;
the servers of the cluster communicating status messages among themselves to maintain the operative server status information and operative port status information current in the configuration rules table;
the operating instructions in the memory unit causing the servers to reconfigure virtual interfaces on the servers by transferring hosting of IP addresses from one operative port of the servers to another operative port of the servers, each IP address used in communicating the data service requests on the computer network; and wherein the execution of the operating instructions to cause reconfiguration of the virtual interfaces operatively:
establishes first and second groups of operative servers of the cluster from the server status information in the configuration rules table in response to the status messages, each group including no more than one server from each server failover pair, establishes a list of operative ports of each server of the first and second groups from the port status information in the configuration rules table in response to status messages, recognizes a change in operative status of any port of any server of the first and second groups from the server status and port status information in the configuration rules table, and transfers the IP address from one port of one server of one of the first and second groups to another operative port of one server of the one group in response to a recognized change in status information, without transferring the IP address from the one server to the other server within the same failover pair.

16. A mass data storage system as defined in claim 15, wherein each server of each group includes a plurality of ports, and the server which has the port that undergoes the change in operative status is designated as an originating server, and the execution of the operating instructions to cause reconfiguration of the virtual interfaces further operatively:

transfers the IP address from one port to another operative port of the originating server in response to recognizing the change in operative status indicated by information in the configuration rules table.

17. A mass data storage system as defined in claim 16, wherein each server within the same group as the originating server other than the originating server is designated as a target server, and the execution of the operating instructions to cause reconfiguration of the virtual interfaces further operatively:

transfers the IP address from one port of the originating server to an operative port of a target server in response to recognizing the change in operative status indicated by information in the configuration rules table.

18. A mass data storage system as defined in claim 17, wherein the execution of the operating instructions to cause reconfiguration of the virtual interfaces further operatively:

attempts to transfer the IP address from one port to another port of the originating server in response to the change in operative status; and when the attempted transfer from one port to another port on the originating server is unsuccessful, attempts to transfer the IP address from the changed status port of the originating server to an operative port of one target server.

19. A mass data storage system as defined in claim 18, wherein the execution of the operating instructions to cause reconfiguration of the virtual interfaces further operatively:

continues the attempts to transfer the IP address from the changed status port of the originating server to an operative port of each target server until the attempted transfer is successful.

20. A mass data storage system as defined in claim 15, wherein the servers of the cluster are interconnected by a cluster switching network for communicating data service requests among all the servers of the cluster, and each server is connected to at least one data storage unit by which to perform the data service requests communicated on operative ports attached to the server, and the execution of the operating instructions further operatively:

communicates data service requests through the cluster switching network from the server having the operative port to which the IP address has been transferred to the server connected to the data storage unit which is accessed to perform the data service requests.

21. A mass data storage system connected to a computer network, comprising:

a plurality of servers each including at least one port for interfacing with the computer network, at least one port of each server is assigned an Internet Protocol (IP) address, pairs of servers in the plurality of servers being interconnected in server failover pairs; and wherein:

each server from each server failover pair is assigned to a separate one of two groups; and upon the failure of the port of any one of the plurality of servers, the IP address assigned to the failed port is transferred to an operative port on another server within the same group as the server having the failed port, whereby the transfer of the IP address from the server with the failed port is not to the other server of the same server failover pair.

22. A mass data storage system as defined in claim 21, wherein each server assigned to both the first and second groups includes a plurality of ports, and wherein:

upon the failure of a port of any one of the plurality of servers, an attempt is made to transfer the IP address assigned to the failed port to an operative port on the one server, and when the attempted transfer is unsuccessful, an attempt is made to transfer the IP address to another port on another server within the same group as the server having the failed port.

* * * * *